UNITED STATES PATENT OFFICE.

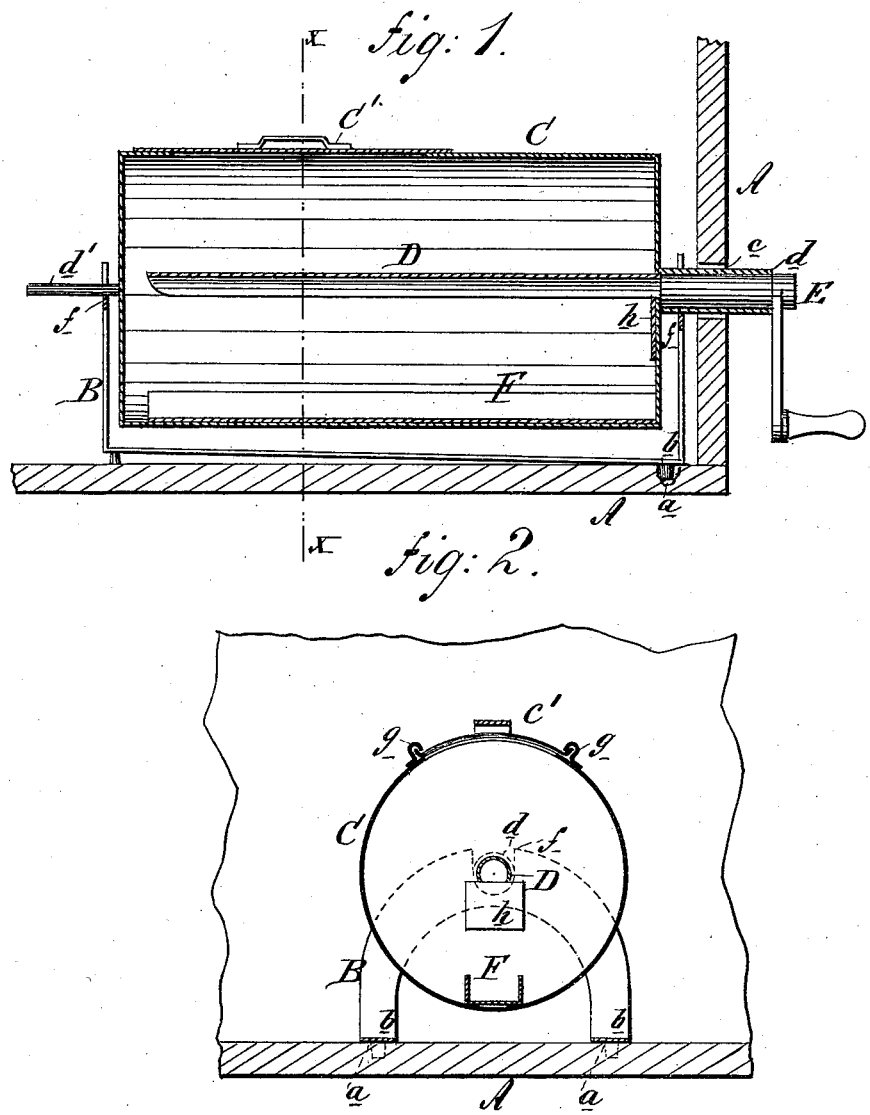

HARRISON OWENS, OF FORT WORTH, TEXAS.

COFFEE-ROASTER.

SPECIFICATION forming part of Letters Patent No. 237,895, dated February 15, 1881.

Application filed December 2, 1880. (No model.)

*To all whom it may concern:*

Be it known that I, HARRISON OWENS, of Fort Worth, in the county of Tarrant and State of Texas, have invented a new and Improved Coffee-Roaster, of which the following is a specification.

The object of this invention is to provide a simple and inexpensive coffee-roaster from which the aroma of the coffee cannot escape, to be used in the oven of a stove or range.

In this invention the coffee is roasted in a revolving cylinder; and the invention consists of a cylinder provided with a hollow trunnion, and of a semi-tubular tester introduced through said trunnion into the cylinder, which tester serves as a handle for revolving the cylinder, and can be withdrawn from time to time with samples of coffee to enable the operator to judge of the progress of the roasting process.

Figure 1 is a longitudinal vertical section of the device. Fig. 2 is a transverse vertical section of the same on line $x\ x$, Fig. 1.

Similar letters of reference indicate corresponding parts.

In the drawings, A represents the bottom and front of an oven, the bottom having holes $a\ a$ made in it for the reception of studs $b\ b$, that project from the bottom of the frame B, and thereby hold said frame B securely in position, while the front of the oven has an opening, $c$, made in it, through which protrudes the hollow trunnion $d$ of the cylinder C. In the upright end pieces of the frame B are formed bearings $f\ f$ for supporting the trunnions $d\ d'$, the lattter of which is a simple rod secured centrally to the rear end of the cylinder C. The cylinder C is provided with a door, C', sliding in guides $g\ g$, and upon the interior surface of said cylinder C is secured a trough or elongated plate, F, that serves to carry some of the coffee upward when the said cylinder C is revolved, and direct its fall into the tester D, which is held with its concave face toward said trough F by a plate, $h$, that is secured on the inside of the cylinder-head, beneath the trunnion $d$, so that its upper straight edge shall serve as a bearing for the flat edges of the said tester D, thereby preventing the turning of said tester D and compelling the revolution of the cylinder C when the crank E, which is attached to the outer end of the tester D, is turned. Said tester D is fitted in the trunnion $d$, so that it can at any time be readily withdrawn with its concave face uppermost.

As the roasting of the coffee progresses the tester D can be withdrawn from time to time with a sample of the coffee, so that the operator can learn at once without opening the cylinder C or the oven containing it the progress of the roasting.

When the roasting of the coffee is completed the tester D may be withdrawn, the oven-door opened, and the frame B and cylinder C be taken out of the oven.

Having thus described my invention, I claim as new and desire to secure by Letters Patent—

In a coffee-roaster, the combination, with the cylinder C, provided with trough F, bearing-plate $h$, and hollow trunnion $d$, of the tester D, substantially as herein shown and described.

HARRISON OWENS.

Witnesses:
 ISAAC W. ROUSE,
 JOHN M. ROBBINS.